United States Patent
Fall et al.

(10) Patent No.: US 7,922,006 B2
(45) Date of Patent: Apr. 12, 2011

(54) CIRCUMFERENTIALLY PLEATED FILTER ASSEMBLY AND METHOD OF FORMING THE SAME

(75) Inventors: Brian L. Fall, East Haddam, CT (US);
Thomas J. Hamlin, Vernon, CT (US);
Mahesh Z. Patel, Pantsville, CT (US);
John L. Pulek, Cheshire, CT (US);
Aaron Spearin, Willimantic, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 358 days.

(21) Appl. No.: 11/770,834

(22) Filed: Jun. 29, 2007

(65) Prior Publication Data

US 2007/0262016 A1 Nov. 15, 2007

Related U.S. Application Data

(63) Continuation of application No. 10/993,824, filed on Nov. 19, 2004, now abandoned.

(51) Int. Cl.
*B01D 27/06* (2006.01)
*B01D 29/07* (2006.01)
*B01D 27/00* (2006.01)

(52) U.S. Cl. ............... 210/493.1; 210/493.2; 210/493.3; 210/493.4; 210/493.5; 210/342; 210/338; 56/380; 56/521

(58) Field of Classification Search .................. None
See application file for complete search history.

(56) References Cited

U.S. PATENT DOCUMENTS

| | | | |
|---|---|---|---|
| 624,014 A | 5/1899 | Hagerty | |
| 1,647,799 A | 11/1927 | Hammer | |
| 1,809,716 A | 6/1931 | McDonough | |
| 1,846,584 A | 2/1932 | Clark | |
| 2,323,896 A | 7/1943 | Cahill | |
| 2,387,368 A | 10/1945 | Vokes | |
| 2,395,449 A | 2/1946 | Briggs | |
| 2,420,414 A * | 5/1947 | Briggs | 210/457 |
| 2,448,157 A | 8/1948 | Schneider | |
| 2,586,078 A | 2/1952 | O'Malley | |
| 2,689,652 A | 9/1954 | Gretzinger | |
| 2,758,760 A | 8/1956 | Bock et al. | |
| 2,792,118 A | 5/1957 | Kraissl, Jr. | |
| 2,801,009 A * | 7/1957 | Bowers | 210/493.4 |

(Continued)

FOREIGN PATENT DOCUMENTS

DE 1118758 12/1961

(Continued)

OTHER PUBLICATIONS

Search Report.

*Primary Examiner* — Krishnan S Menon
*Assistant Examiner* — Benjamin Kurtz

(57) ABSTRACT

A filter assembly is provided which includes an outer filter sleeve formed at least in part by a plurality of pleats, an inner filter sleeve formed at least in part by a plurality of pleats, wherein the inner and outer filter sleeves define a passage therebetween. An inlet cap is secured to a first end of the inner and outer filter sleeves and it has at least one inlet port communicating with the passage, and an end cap is secured to a second end of the inner and outer filter sleeves and it has an end surface closing the passage. Methods of forming such a filter assembly are also provided.

34 Claims, 13 Drawing Sheets

U.S. PATENT DOCUMENTS

| | | |
|---|---|---|
| 2,840,283 A | 6/1958 | Roussos |
| 2,979,240 A | 4/1961 | Liebeskind |
| 3,349,159 A | 10/1967 | Luboshez |
| 3,390,218 A | 6/1968 | Painter et al. |
| 3,733,267 A | 5/1973 | Haase |
| 3,988,244 A | 10/1976 | Brooks |
| 4,377,431 A | 3/1983 | Chodosh |
| 4,465,213 A | 8/1984 | Lehmann et al. |
| 4,552,661 A | 11/1985 | Morgan |
| 4,680,118 A | 7/1987 | Taga |
| 4,828,698 A | 5/1989 | Jewell et al. |
| 4,863,602 A | 9/1989 | Johnson |
| 4,877,526 A | 10/1989 | Johnson et al. |
| 5,075,004 A | 12/1991 | Gershenson et al. |
| 5,174,896 A | 12/1992 | Harms, II |
| 5,252,207 A | 10/1993 | Miller et al. |
| 5,275,743 A | 1/1994 | Miller et al. |
| 5,342,511 A | 8/1994 | Brown et al. |
| 5,472,606 A * | 12/1995 | Steere et al. .............. 210/489 |
| RE35,241 E | 5/1996 | Capy et al. |
| 5,543,047 A | 8/1996 | Stoyell et al. |
| 5,690,765 A | 11/1997 | Stoyell et al. |
| 5,702,037 A | 12/1997 | Merkel |
| 5,814,219 A | 9/1998 | Friedmann et al. |
| 5,840,188 A | 11/1998 | Kirsgalvis |
| 5,882,288 A | 3/1999 | Paul et al. |
| 6,030,531 A | 2/2000 | Gershenson |
| 6,048,298 A | 4/2000 | Paul et al. |
| 6,113,784 A | 9/2000 | Stoyell et al. |
| 6,238,560 B1 | 5/2001 | Gershenson |
| 6,315,130 B1 | 11/2001 | Olsen |
| 6,409,919 B1 | 6/2002 | Tara |
| 6,511,598 B2 | 1/2003 | Gershenson |
| 6,585,892 B2 * | 7/2003 | Gershenson ............... 210/315 |
| 6,585,893 B2 | 7/2003 | Gershenson |
| 6,626,299 B1 | 9/2003 | Brown et al. |
| 6,706,198 B2 | 3/2004 | Gershenson |
| 6,712,967 B2 | 3/2004 | Gershenson |
| 6,872,309 B2 | 3/2005 | Pearson et al. |
| 2004/0075221 A1 | 4/2004 | Gershenson et al. |

FOREIGN PATENT DOCUMENTS

| | | |
|---|---|---|
| DE | 3905854 | 9/1990 |
| GB | 823648 | 11/1959 |
| GB | 1400147 | 7/1975 |
| JP | 60125220 | 7/1985 |
| SU | 176120 | 9/1992 |
| WO | WO 01/21279 A1 | 3/2001 |

* cited by examiner

US 7,922,006 B2

CIRCUMFERENTIALLY PLEATED FILTER ASSEMBLY AND METHOD OF FORMING THE SAME

RELATED APPLICATIONS

This application is a continuation of U.S. application Ser. No. 10/993,824 filed Nov. 19, 2004, now abandoned the disclosure of which is hereby incorporated by reference to the extent not inconsistent with the present application.

BACKGROUND OF THE DISCLOSURE

The subject disclosure is directed to fluid filtration, and more particularly, to a bag-type filter assembly having two concentric circumferentially pleated media sleeves defining an annular passage therebetween, which receives fluid for filtration.

Bag-type filter systems for fluid filtration are well known in the art. These systems typically include a cylindrical housing, which is closed at one end and has a removable cover at the opposed end. An inlet conduit delivers fluid to be filtered into the housing and an outlet conduit removes filtered fluid from the housing.

Replaceable bag filters are disposed within the housing in order to filter fluids delivered thereto. Typically, bag filters include filter media having an open upper end and a closed bottom. The filter bag is supported within an open mesh basket or cage, which is typically suspended within the housing. The basket is intended to support the media of the filter bag to prevent it from bursting as the bag fills with liquid.

There are several disadvantages associated with existing bag-type filters. One such disadvantage is that filter bags have a large hold-up volume. Thus, removal of a used filter bag is quite difficult, because it can be relatively heavy. A full filter bag could weigh as much as thirty pounds and it may contain hazardous substances, adding to the difficulty of removal. To remedy this situation, evacuation balloons have been used to reduce the hold-up volume prior to the removal of a used bag. However, these balloons are often cumbersome to handle.

Another disadvantage associated with existing bag filters is that they provide a limited amount of effective filtration area. Efforts to increase the effective filtration area of existing bag filter have been limited because of the industry standardization of basket sizes. That is, filter bags are typically available it two distinct sizes: (#1) 7" diameter×16" long; and (#2) 7" diameter ×32" long. Consequently, any increase in effective filtration area is limited by the requirement that the outer diameter of the filter cannot be altered.

There have been a number of efforts to design bag filters to minimize hold-up volume and maximize the effective area for filtration. For example, U.S. Pat. No. 4,081,379 discloses an annular filter bag that provides more available surface area than a conventional filter bag. U.S. Pat. Nos. 4,863,602 and 4,877,526 disclose a bag filter with increased surface area that includes multiple wrapped layers of melt-blown media with a flexible transport layer in between. The Hayward Lofclear 500 Series bag filter provides increased surface area by folding a pre-filter layer, which is wrapped by final filtration layers. For the most part, these prior art efforts have fallen short.

A particularly useful bag-type filter assembly is disclosed in U.S. Pat. Nos. 6,030,531 and 6,238,560. In this unique filter assembly, effective surface area is increased by providing two concentric media sleeves connected at one end to an open inlet cap and at the opposed end to a closed end cap. The dual sleeve configuration also minimizes the hold-up volume of fluid remaining in the filter element after use, making it easier to remove from the filter basket/housing.

Over the years, the design of cylindrical pleated filter cartridges has involved similar efforts to maximize the amount of filter media or surface area that may be fit into a filter cartridge having a given outer diameter. In a standard radially pleated filter cartridge, the number of pleats that can be packed about the cartridge core limits the amount of filter media that may be packed into the cartridge. Consequently, there is a substantial amount of empty space between adjacent pleats at the outer periphery of the filter element.

A spiral pleated filter element is comparable to a standard radially pleated filter element in that it includes a plurality of longitudinal pleats disposed in a cylindrical configuration. In a spiral-pleated filter, however, the ends of the pleats are rolled over to minimize the spacing between adjacent pleat surfaces near an outer diameter of the filter element. In this case, the pleat height is substantially greater than the distance between the outer periphery of the cartridge core and the inner periphery of the cartridge cage. Consequently, in a spiral-pleated filter, the pleats at the outer periphery occupy the excess volume that would normally represent empty space in a radially pleated filter element. This provides increased filter surface area as compared to a standard radial pleat configuration.

It would be beneficial to employ techniques used to enhance effective surface area in pleated filter cartridges to bag-type filters. This would provide increased filter life, lower pressure drop and lower the operating costs for the customer.

SUMMARY OF THE DISCLOSURE

The subject disclosure is directed to a new and useful bag-type filter assembly, which includes an outer filter sleeve formed at least in part by a plurality of longitudinally extending pleats, and an inner filter sleeve formed at least in part by a plurality of longitudinally extending pleats. The concentric pleated filter sleeves provide a significant increase in the effective surface area of the filter assembly of the subject disclosure, as compared to conventional bag-type filters known in the art. The enhanced surface area increases the life of the filter, lowers pressure drop and lowers the operating costs for the customer. The concentric inner and outer filter sleeves define an annular fluid passage therebetween, which has a reduced hold-up volume as compared to conventional bag-type filters known in the art. This reduction in hold-up volume eases the removal of the filter assembly from its housing after the filter has exceeded its useful lifespan.

An inlet cap is secured to a first end of the inner and outer filter sleeves and it has at least one inlet port communicating with the fluid passage of the filter assembly. An end cap is secured to a second end of the inner and outer filter sleeves and it has an end surface closing the fluid passage. In a presently preferred embodiment of the disclosure, a sheath surrounds the downstream side of the outer filter sleeve to provide a smooth continuous surface to protect the filter media and aid in installation and removal from the basket. The sheath is formed from a material having a relatively open porosity, such as a polymeric mesh or screen. It also envisioned that a similar sheath would surround or otherwise protect the downstream side of the inner filter sleeve to further aid in the installation and removal of the filter from the basket.

Preferably, each filter sleeve includes a plurality of longitudinally extending, circumferentially disposed arcuate pleats. In an embodiment of the disclosure, adjoining circumferentially disposed arcuate pleats of either or both filter sleeves partially overlap one another over approximately 50% to 80% of the arc length or arcuate height of the pleats. In an embodiment of the disclosure, adjoining circumferentially disposed arcuate pleats of either or both filter sleeves are circumferentially spaced from one another. In an embodiment of the disclosure, the circumferentially disposed arcuate pleats of either or both filter sleeves are uniformly distributed. In an embodiment of the disclosure, the circumferentially disposed arcuate pleats of either or both filter sleeves have equal arc length. In embodiments of the disclosure, each of the circumferentially disposed arcuate pleats of the outer and inner filter sleeves has a radially outer pleat leg and a radially inner pleat leg. Typically, the arc length or arcuate height of the radially inner pleat leg is shorter than the arc length or arcuate height of the radially outer pleat leg.

The outer filter sleeve and the inner filter sleeve are each preferably formed from a multi-layered pleated composite that includes at least one layer of filter media, an upstream support/drainage layer and a downstream support/drainage layer. The filter media is preferably selected from the group of filter materials consisting of any flexible and pleatable filter media such as melt-blown media, felt, wet laid paper (glass fiber), with the preferred medias being selected from melt-blown filter media and microporous membranes. Other filter materials may also be used depending upon the application in which the filter is employed.

In one embodiment of the disclosure, the multi-layered composite includes plural layers of filter media each having the same porosity. In another embodiment of the disclosure, the multi-layered composite includes plural layers of filter media each having a different porosity. The support/drainage layers of the multi-layered composite are preferably formed from materials selected from the group consisting of extruded polymeric net or meshes and polymeric nonwovens (i.e., spunbonded, etc.). Other drainage/support materials may also be used depending upon the application within which the filter is employed.

In accordance with an embodiment of the disclosure, the inlet cap is bonded to the outer filter sleeve and the inner filter sleeve, and an elastomeric seal may be molded over an outer periphery of the inlet cap. The end cap is also bonded to the outer filter sleeve and the inner filter sleeve. Preferably, the inner filter sleeve defines a central bore of the filter assembly and the end cap includes a central exit port communicating with the central bore.

In an embodiment of the disclosure, at least one of the inner and outer filter sleeves is bonded to side surfaces of the inlet cap and end cap. In another embodiment of the disclosure at least one of the inner and outer filter sleeves are bonded to end surfaces of the inlet cap and end cap.

The subject disclosure is also directed to a filter assembly that includes a radially outer filter sleeve formed by a multi-layered pleated composite including a plurality of longitudinally extending circumferentially disposed arcuate pleats, a radially inner filter sleeve arranged concentrically with the radially outer filter sleeve and formed by a multi-layered pleated composite including a plurality of longitudinally extending circumferentially disposed arcuate pleats. The inner filter sleeve defines a central bore, and the inner and outer filter sleeves define an annular passage therebetween. An inlet cap is bonded to an upper end of the inner and outer filter sleeves and it has at least one inlet port communicating with the annular passage. An end cap is bonded to a lower end of the inner and outer filter sleeves, and it has an annular end surface closing the annular passage and a central exit port communicating with the central bore. In addition, a porous sheath of material surrounds the radially outer filter sleeve. A similar sheath may also surround the inner surface of the radially inner filter sleeve.

The subject disclosure also covers a filtration system that includes a housing or pressure vessel having an interior chamber and a removable cover, which is encloses the interior chamber. An inlet conduit delivers unfiltered fluid to the interior chamber of the housing and an outlet conduit carries filtered fluid from the interior chamber of the housing. The system further includes a filter element disposed within the interior chamber of the housing and including concentrically arranged radially inner and radially outer filter sleeves each having a plurality of circumferentially disposed arcuate pleats. The inner and outer filter sleeves define an annular passage therebetween for receiving unfiltered fluid from the inlet conduit of the housing, and the inner filter sleeve defines a central bore communicating with the outlet conduit of the housing.

An inlet cap is secured to an upper end of the inner and outer filter sleeves, with a plurality of inlet ports communicating with the annular passage, and an end cap is secured to a lower end of the inner and outer filter sleeves, with a central exit port communicating with the central bore. Preferably, the inlet cap includes an over-molded peripheral sealing surface for sealingly engaging the cover of the housing when the filter assembly is enclosed therein. In addition, the system includes a perforated basket for supporting the filter assembly within the housing.

The subject disclosure is also directed to a method of forming a filter element which includes the steps of the preparing a plurality of upstanding pleats each having first and second pleat legs, wherein the first pleat leg of one pleat is joined to the second pleat leg of a preceding pleat by a medial pleat section, moving the upstanding pleats into an overlapped condition wherein each medial pleat section becomes part of the second leg of a preceding pleat, and forming the overlapped pleats into a cylindrical configuration. The step of preparing a plurality of upstanding pleats includes forming the upstanding pleats with first and second pleat legs of equal height, first and second pleat legs of different height, or with first and second pleat legs of different height, wherein the height of the first pleat leg is less than the height of the second pleat leg.

The step of preparing a plurality of upstanding pleats includes joining the first pleat leg of one pleat to the second pleat leg of a preceding pleat with a medial pleat section that includes at least one medial pleat segment. The medial pleat section can include two medial pleat segments. These segments can be of equal length or they can be of a different length. The length of the medial pleat section is preferably less than the height of the preceding pleat leg, and more preferably the length of the medial pleat section is about half the height of the preceding pleat leg.

These and other aspects of the bag-type filter assembly of the subject disclosure will become more readily apparent to those having ordinary skill in the art from the following detailed description of the disclosure taken in conjunction with the drawings described below.

BRIEF DESCRIPTION OF THE DRAWINGS

So that those having ordinary skill in the art to which the subject disclosure appertains will more readily understand how to make and use the filter assembly of the subject disclosure, presently preferred embodiments thereof will be described in detail hereinbelow with reference to the drawings, wherein.

DETAILED DESCRIPTION OF THE DISCLOSURE

Figure 1:
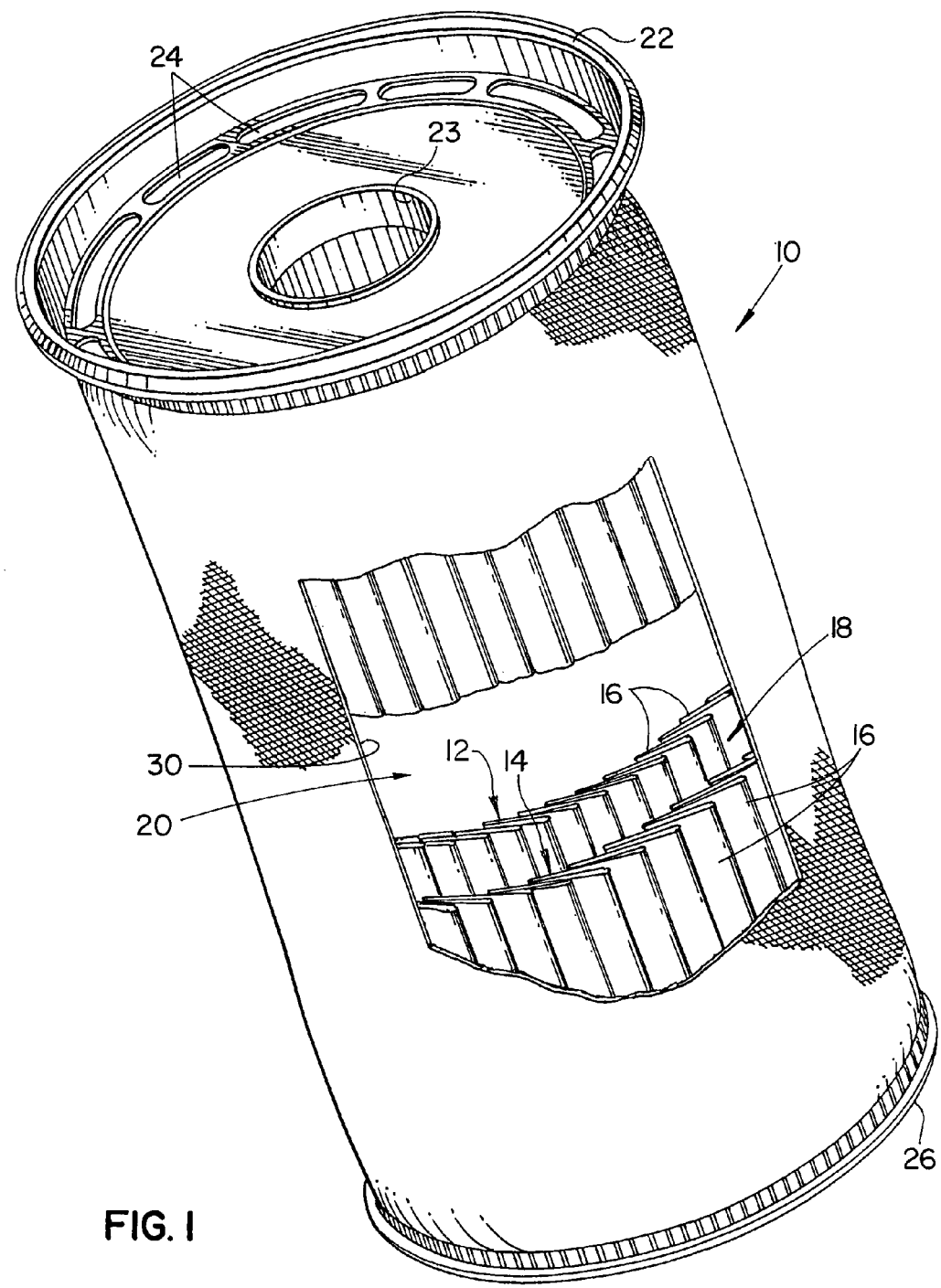
FIG. 1 is a perspective view of a filter assembly constructed in accordance with a presently preferred embodiment of the subject disclosure, wherein a portion of the outer sheath that surrounds the filter element is cutaway to reveal the inner and outer circumferentially pleated filter sleeves which form the filter element, and wherein the pleated filter sleeves are partially sectioned to reveal the pleat configuration thereof and the fluid passage defined therebetween.

Referring now to the drawings wherein like reference numerals identify similar structural elements and/or features of the subject disclosure, there is illustrated in FIG. 1 a filter assembly constructed in accordance with a presently preferred embodiment of the subject disclosure and designated generally by reference numeral 10. Filter assembly 10 is a type of filter assembly commonly referred to as a bag-type filter, which is preferably collapsible and readily disposable after use.

Referring to FIG. 1, the filter assembly 10 includes a generally cylindrical inner filter sleeve 12 and a generally cylindrical outer filter sleeve 14. The inner and outer filter sleeves 12, 14 are each formed, at least in part, from a plurality of longitudinally extending, circumferentially disposed arcuate pleats 16, which will be described in greater detail below. The pleats 16 are used to increase the amount of effective filtration area within the filter assembly relative to prior art bag-type filters. The effective surface area is the amount of filter media that is accessible to fluid during use. An elongated annular passage 18 is defined between the inner and outer pleat sleeve 12, 14, for receiving unfiltered fluid, and the inner filter sleeve 12 defines a central bore 20 of the filter assembly 10 for fluid transfer.

Figure 2:
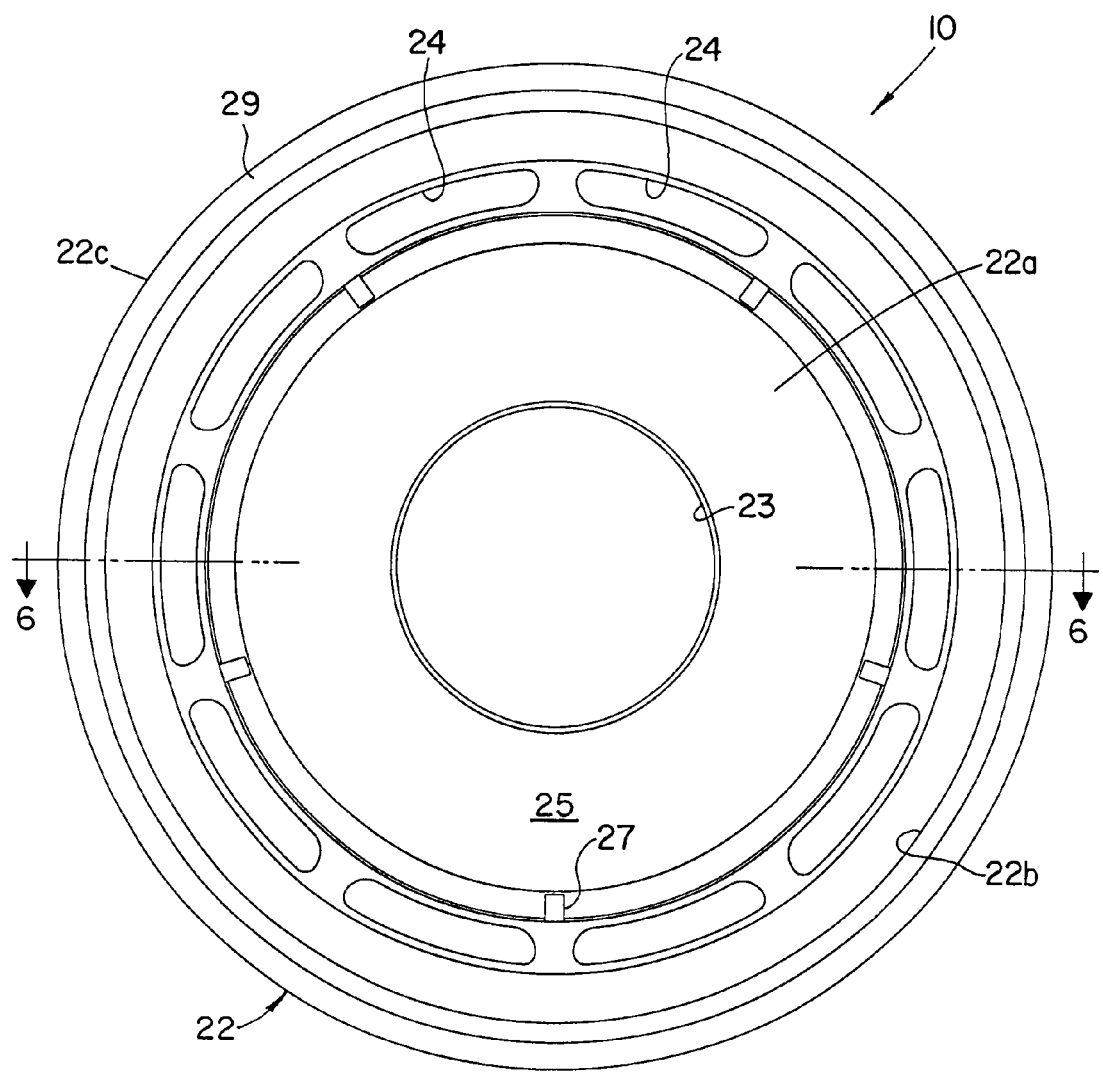
FIG. 2 is a top end view of the filter assembly of FIG. 1, illustrating the structural features of the inlet cap disposed at the upper end of the filter assembly, which includes a plurality of circumferentially spaced apart arcuate inlet ports for admitting fluid into the fluid passage defined between the pleated filter sleeves.

An inlet cap 22 is secured to an upper or first end of the inner and outer filter sleeves 12, 14, in a manner, which will be discussed in greater detail below with reference to FIG. 6. Inlet cap 22, which is best seen in FIG. 2, includes a plurality of circumferentially disposed arcuate inlet ports 24 and a central access port 23. Inlet ports 24 communicate with the annular passage 18 defined between the inner and outer filter sleeves 12, 14 for facilitating the ingress of unfiltered fluid into the passage. The central access port 23 of inlet cap 22 is adapted and configured to mount or otherwise sealingly accommodate an inlet conduit (see FIG. 8), which passes through the central bore 20 of the filter assembly 10 to deliver unfiltered fluid to the inlet ports 24 of inlet cap 22.

Referring to FIG. 2, inlet cap 22 is preferably formed from a high-strength, lightweight, plastic material, such as polypropylene. For ease of assembly, the inlet cap 22 is formed from two distinct structural elements, including an inner body portion 22a and an outer flange portion 22b. The inner body portion 22a of inlet cap 22 defines an impervious annular end surface 25 that defines the central access port 23. Access port 23 is dimensioned and configured to accommodate an inlet conduit, which delivers unfiltered or otherwise untreated fluid into the trough formed by inlet cap 22. The outer flange portion 22b of inlet cap 22 defines the inlet ports 24 that communicate with annular passage 18.

Figure 2A:
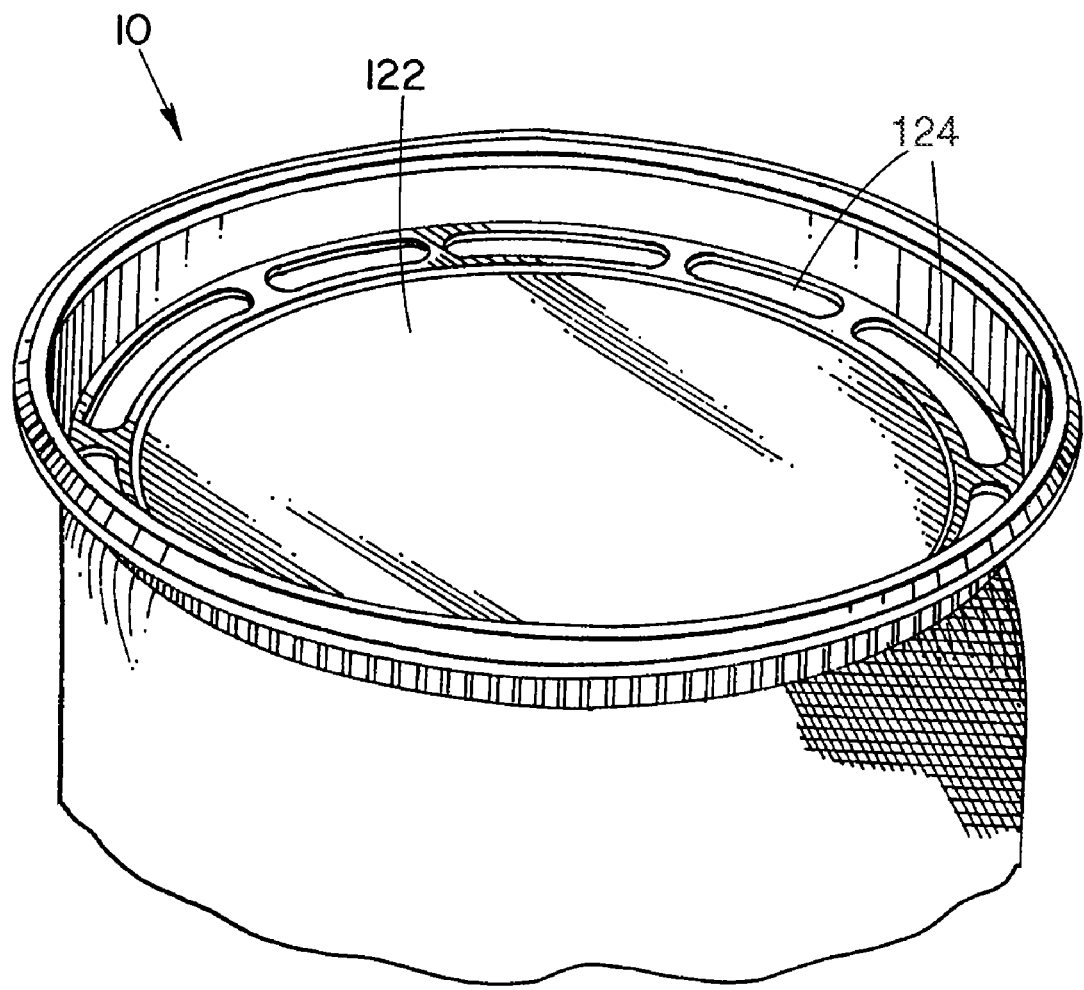
FIG. 2a is a partial perspective view of a filter assembly of the subject disclosure, which includes a closed inlet cap, as compared to the open inlet cap shown in FIG. 2.

In another embodiment of the present disclosure, which is illustrated in FIG. 2a, the inlet cap 122 is closed or blind, and thus there is no central access port formed in the end surface thereof. In such an instance, the inlet conduit, which delivers unfiltered fluid to inlet ports 24 of inlet cap 122, communicates with the filter assembly through the top or cover of the housing, which supports the filter assembly.

The two component parts of the inlet cap 22 are preferably mechanical secured together through the interaction of a number of locking features including a plurality of circumferentially spaced apart engagement tabs 27 formed on the inner body portion 22a of the inlet cap 22 and a plurality of corresponding recesses (not shown) formed on the outer flange potion 22b of the inlet cap 22. In addition, while not shown, a series of arcuate tabs project radially inwardly from the outer body portion 22b to engage a corresponding annular lip formed on the surface of the inner body portion 22a. Alternate means of securing or otherwise fastening or joining the two components of the inlet cap together may be employed. It is also envisioned that inlet cap 22 can be formed as a single unitary member.

Figure 6:
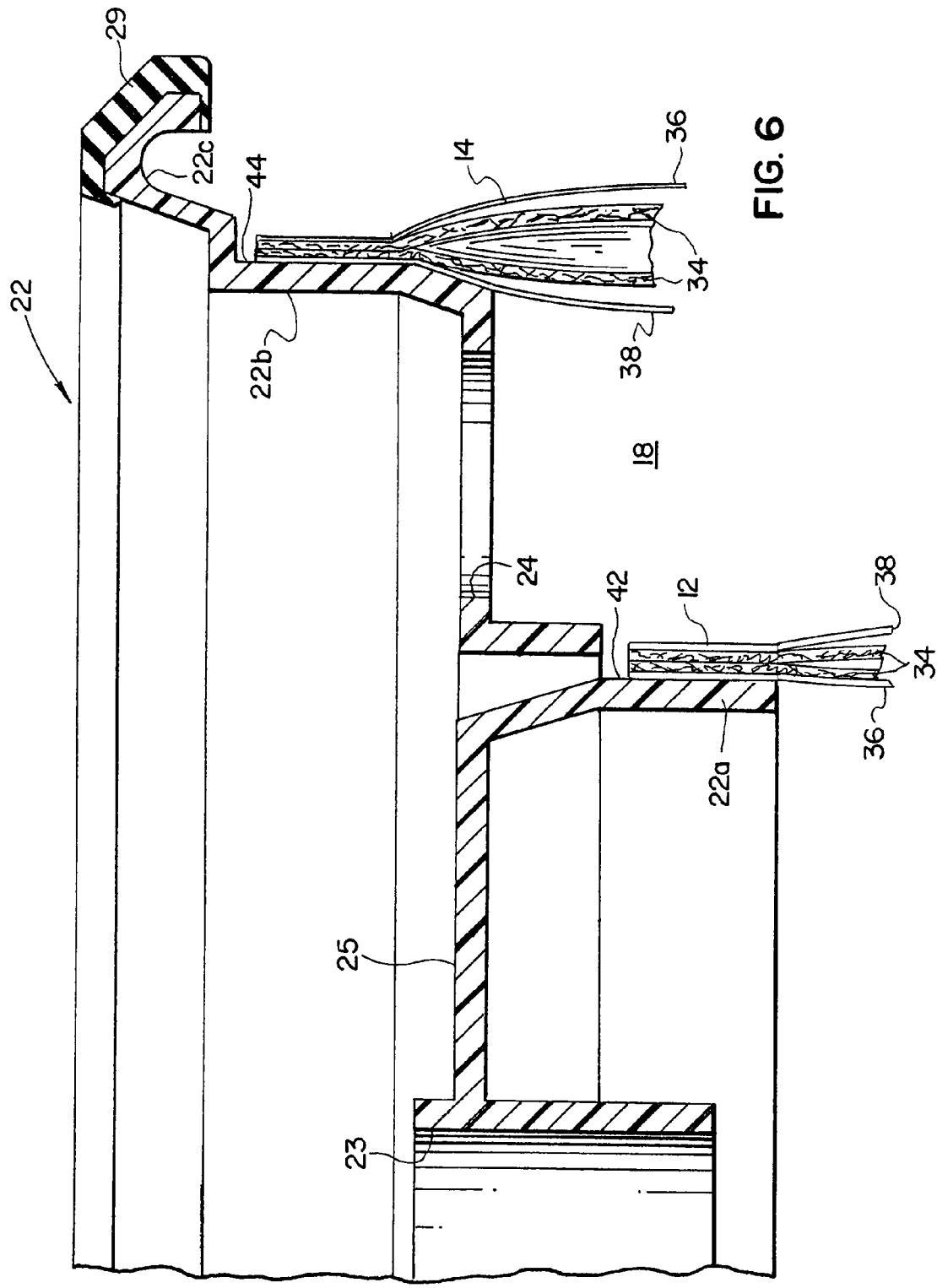
FIG. 6 is a cross-sectional view of a portion of the inlet cap shown in FIG. 2, taken along line 6-6, illustrating the manner in which the inner and outer sleeves of the filter element are secured to the inlet cap.

The outer flange portion 22b of inlet cap 22 also has a radially outer shoulder 22c that may include an elastomeric over-molded sealing surface 29, best seen in FIG. 6. The over-molded sealing surface 29 improves the seal interface between the inlet cap 22 of filter assembly 10 and the housing which supports the filter assembly 10 during use, as shown for example in FIG. 8. An over-molded seal of this type is disclosed in a commonly assigned U.S. Provisional Patent Application Ser. No. 60/404,111 entitled "Seal For Collapsible Filter Element," filed dated Aug. 15, 2002, which is incorporated by reference herein.

Figure 3:
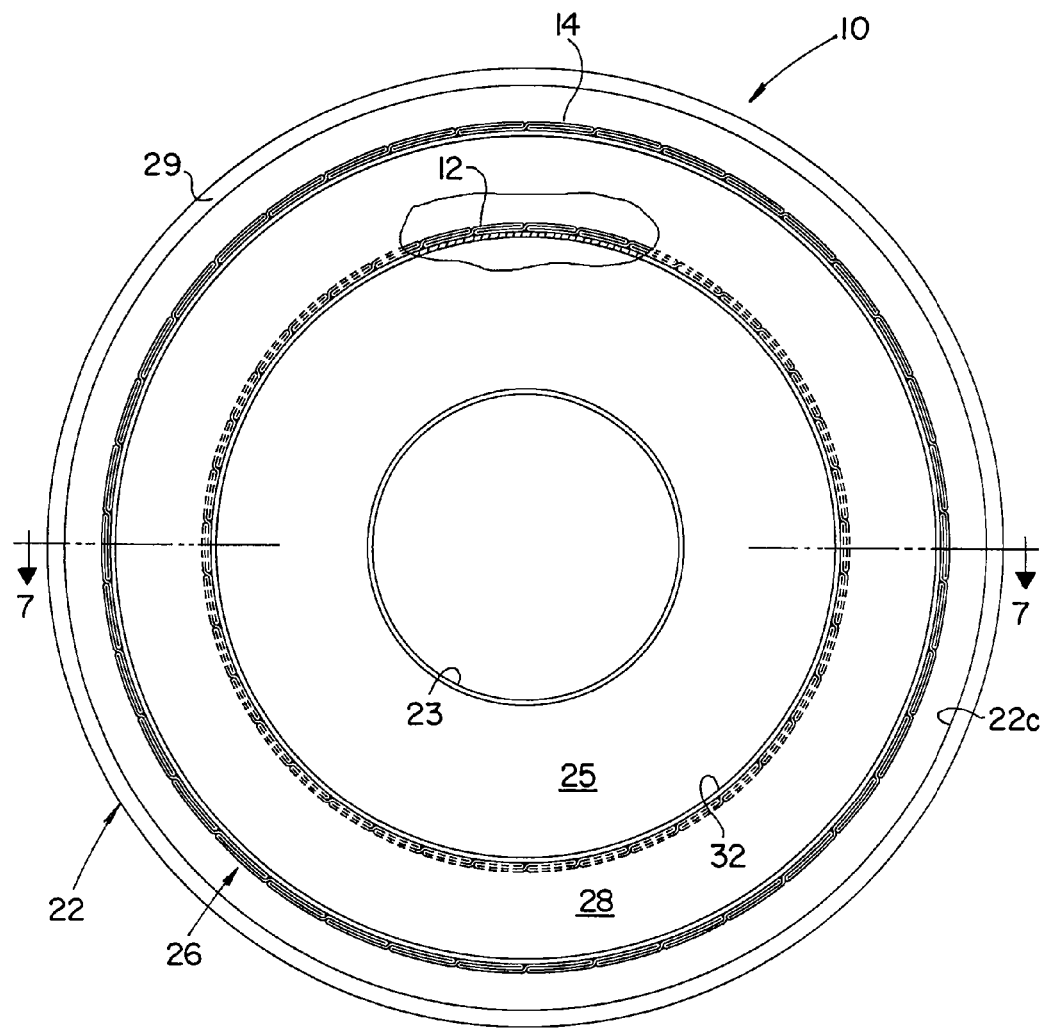
FIG. 3 is a bottom end view of the filter assembly of FIG. 1, illustrating the structural features of the end cap disposed at the lower end of the filter assembly, which has an annular end surface closing the passage defined between the pleated filter sleeves.

Referring again to FIG. 1, an end cap 26 is secured to a lower or second end of the inner and outer filter sleeves 12, 14, in a manner, which will be discussed in greater detail below with reference to FIG. 7. As best seen in FIG. 3, end cap 26, has an impervious annular end surface 28 closing the annular passage 18 between the inner and outer filter sleeves 12, 14. End surface 28 prevents the egress of unfiltered fluid from filter assembly 10. In addition, end cap 26 has a relatively large central exit port 32 communicating with the central bore 20 formed by inner filter sleeve 12 to facilitate the egress of filter fluid from the filter assembly 10, and to permit the passage of the inlet conduit shown in FIG. 8. It is envisioned and encompassed by the subject disclosure that end cap 26 could be formed from two separate components. These components would be configured and assembled in a manner similar to the two component parts of the inlet cap 22.

With continuing reference to FIG. 1, a sheath 30 surrounds the outer filter sleeve 14 and is formed from a material having a relatively open porosity, such as for example, a polymeric mesh or screen. Sheath 30 serves to ease the installation of the filter assembly 10 into a basket (not shown), by reducing hang-ups of the pleats on the sides of the basket. It is envisioned that this same type of sheathing may be associated with the radially inner surface of the inner filter sleeve 12, within the central bore 20 of filter assembly 10, to protect the inner filter sleeve 12 from the basket during installation and to ease removal.

Figure 1A:
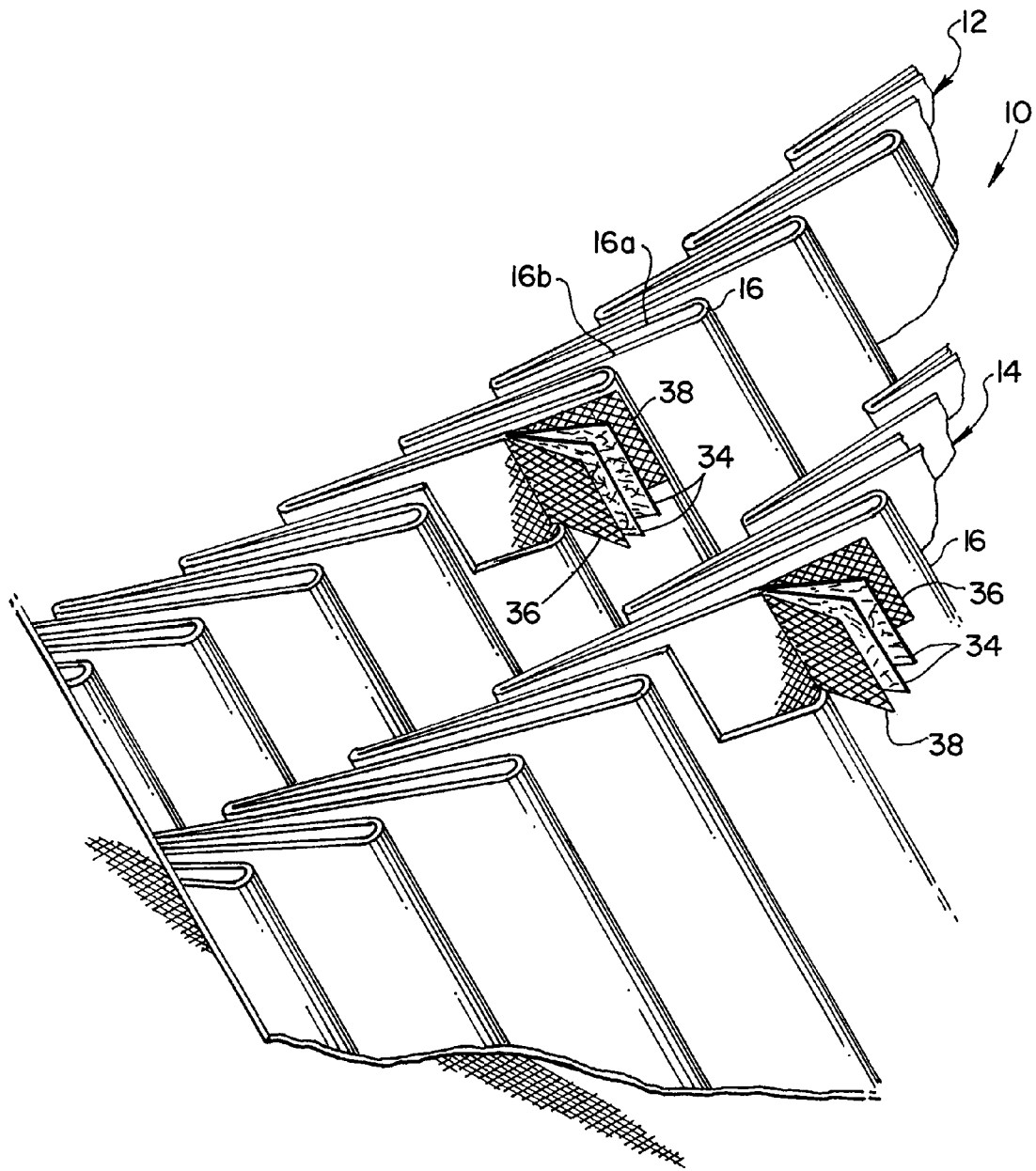
FIG. 1a is an enlarged localized perspective view of the pleated filter sleeves shown in FIG. 1, wherein a section of a pleat of each sleeve is divided to illustrate the upstream drainage/support layer, the downstream drainage/support layer and the plural media layers which form the pleated composite.

Referring now to FIG. 1a, the inner and outer filter sleeves 12, 14 of filter assembly 10 are each formed by a multi-layered pleated composite. The pleated composite structure may be produced on a conventional pleating machine, such as a pusher bar pleater, blade type pleater, or gear type pleater or it may be formed by conventional folding techniques. Alternatively, it is envisioned that the pleated composite could be produced using a device in which the media is wrapped or otherwise formed about a mandrel that is repeatedly indexed in a reciprocating or similar manner.

The composite preferably includes one or more layers of filter media 34, an upstream support/drainage layer 38 and a downstream support/drainage layer 36. In the case of the outer filter sleeve 14, the upstream support/drainage layer 38 is associated with the radially inner side of the sleeve, while the downstream support/drainage layer 36 is associated with the radially outer side of the sleeve. Conversely, in the case of the inner filter sleeve 12, the upstream support/drainage layer 38 is associated with the radially outer side of the sleeve, while the downstream support/drainage layer 36 is associated with the radially inner side of the sleeve.

The upstream and downstream drainage/support layers 36, 38 of the multi-layered composite from which the inner and outer filter sleeves 12, 14 are formed can be made of any material having suitable drainage characteristics. For example, the drainage/support layers 36, 38 can be in the form of a mesh or screen or a porous woven or non-woven sheet. Meshes and screens come in various forms including metallic meshes that are often used for high temperature filtration applications, and polymeric meshes that are typically used for lower temperature applications. Polymeric meshes come in the form of woven meshes and extruded meshes. Either type may be employed. It is envisioned that the upstream and downstream drainage/support layers 36, 38 of the inner and outer sleeves 12, 14 can be made from the same or different material depending upon the filtration application in which filter assembly 10 is employed.

The filter media layers 34 of the multi-layered composite from which the inner and outer filter sleeves 12, 14 are formed can be selected in accordance with the fluid to be filtered and the desired filtering characteristics. The filter medium can comprise a porous film, i.e. microporous membrane or a fibrous sheet or mass i.e. needled felt, melt-blown, glass fiber, etc. It may have a uniform or graded pore structure and any appropriate effective pore size, and it may be formed from any suitable material, such as a natural material or synthetic polymer. As compared to conventional radial pleated filters or spiral pleated filters, the filter assembly of the subject disclosure can employ relatively thick filter media and support/drainage material without reducing the effective filtration area of the filter assembly.

It is also envisioned that the filter media can include two or more layers of media having different filtering characteristics, wherein one layer would serve as a prefilter for the other layer. In one embodiment of the disclosure, the multi-layered composite from which the inner and outer sleeves 12, 14 are formed includes plural layers of filter media 34 each having the same porosity. In another embodiment of the disclosure, the multi-layered composite from which the inner and outer sleeves 12, 14 are formed includes plural layers of filter media 34 each having a different porosity. In such an instance, layers of more open, i.e., less retentive, grades of media would be disposed on the upstream side of the composite and layers of tighter, i.e., more retentive, grades of media would be disposed on the disposed downstream side of the composite. It is also envisioned that a layer or layers of non-pleated media more open than the most open pleated media layer, can be positioned on the upstream side of both pleated filter sleeves 12, 14. These layers would serve to reduce the loading on the downstream pleated medias, promoting extended life.

It is also envisioned and well within the scope of the subject disclosure that the composite from which filter sleeves 12, 14 are formed can consist of one or more layers of media laminated to one or more layers of a support/drainage material. For example, a fluoropolymer media may be laminated to a spunbonded polypropylene support/drainage material. Alternatively, a fluoropolymer media layer laminated to a polypropylene symmetric or asymmetric mesh or netting. There are significant advantages to using such laminated materials, including improvements in inventory, manufacturing and assembly.

In an exemplary embodiment of the subject disclosure, the material defining the filter media layers 34 of the inner and outer filter sleeves 12, 14 are meltblown polypropylene medias. The material defining the upstream support layers 38 of the inner and outer filter sleeves 12, 14 is polymeric netting, and the material defining the downstream drainage layers 36 of the inner and outer filter sleeves 12, 14 is a non-woven spunbond material. In this exemplary embodiment of the subject disclosure, the inner pleated filter sleeve 12 has an inner diameter of about 4.750" and the outer pleated filter sleeve 14 has an outer diameter of about 6.687". These dimensions are dependent upon the dimensions of the basket within which the filter assembly is deployed for service.

It is envisioned that the longitudinally extending circumferentially disposed arcuate pleats 16 of the inner filter sleeve 12, the outer filter sleeve 14 or both the inner and outer filter sleeves 12, 14 have equal arc length. Each arcuate pleat 16 has a pair of legs, including a radially inner leg 16a and a radially outer leg 16b, as illustrated for example in FIG. 1a. The two legs 16a, 16b of each pleat 16 have a different arc length or arcuate height. The arc length of the radially inner pleat leg 16a is typically shorter or less than the arc length of the radially outer pleat leg 16b. For purposes of this disclosure, the overall arcuate height of each pleat 16 is measured relative to the inner pleat leg 16a thereof.

In one exemplary embodiment of the disclosure, the arc length or arcuate height $h_i$ of the radially inner leg 16a of each pleat 16 is about 1.0 inch and the arc length or arcuate height $h_o$ of the radially outer leg 16b of each pleat 16 is about 1.5 inches. In another exemplary embodiment of the disclosure, the arc length or arcuate height $h_i$ of the radially inner leg 16a of each pleat 16 is about 0.75 inches and the arc length or arcuate height $h_o$ of the radially outer leg 16b of each pleat 16 is about 1.125 inches.

Figure 4:
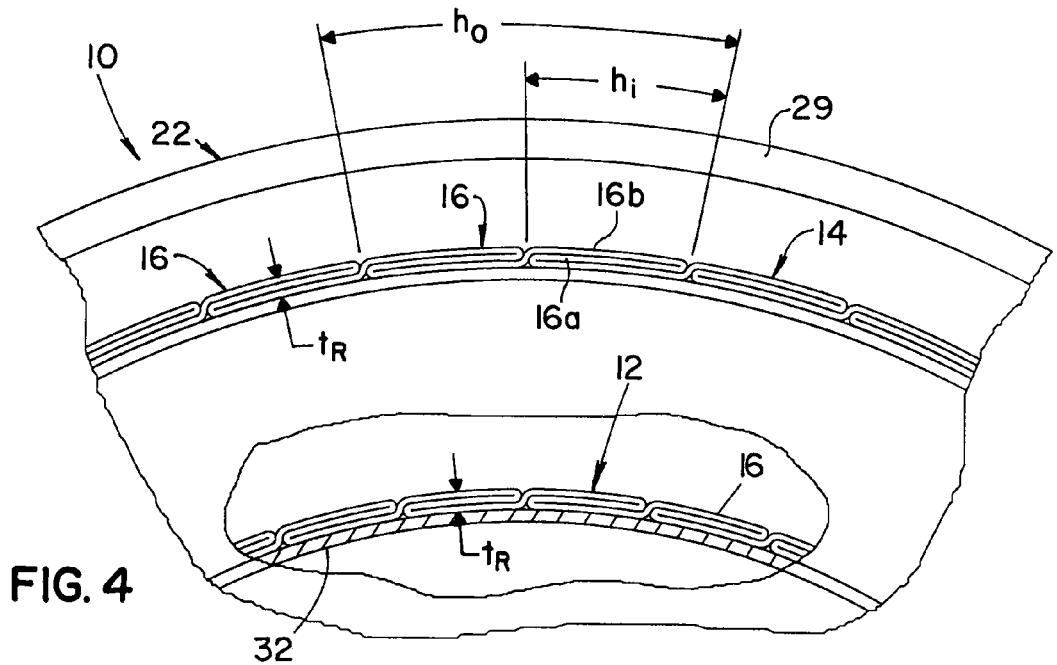
FIG. 4 is an enlarged localized end view of the filter assembly, with a portion of the end cap broken away to reveal the pleat configuration of the inner filter sleeve, and wherein adjoining circumferentially disposed arcuate pleats of the inner and outer filter sleeves abut one another, whereby the crest of one pleat follows the base of an adjoining pleat.

It is envisioned that adjoining or otherwise adjacent circumferentially disposed arcuate pleats 16 of the inner filter sleeve 12, the outer filter sleeve 14 or both the inner and outer filter sleeves 12, 14 and are uniformly distributed about the circumference of the inner and outer filter sleeves 12, 14. That is, the pleats are uniformly spaced from one another, so that there is no pleat overlap, as shown for example in FIG. 4. In other words, the crown or top of each pleat 16 resides at or near the root or base of an adjoining pleat 16, unlike conventional radially pleated cartridges wherein the roots and crowns of the pleats are radially spaced from one another. Consequently, the inner and outer filter sleeves 12, 14 of filter assembly 10 have a substantially continuous radial thickness $t_R$ equal to three (3) times the thickness of a pleat leg, about substantially the entire circumference of each filter sleeve. In this instance, the circumference "C" of each filter sleeve 12, 14 is defined by the following equation:

$$C=h_i \cdot N$$

where N is the number of pleats forming the filter sleeve.

It is also envisioned that adjoining or otherwise adjacent circumferentially disposed arcuate pleats 16 of the inner filter sleeve 12, the outer filter sleeve 14, or both the inner and outer filter sleeves 12, 14 partially overlap one another. In accordance with the subject disclosure, adjoining or otherwise adjacent circumferentially disposed arcuate pleats 16 of the inner filter sleeve 12, the outer filter sleeve 14 or both the inner and outer filter sleeves 12, 14 can overlap one another over approximately 50% to 80% of the arc length of the pleats, measured relative to the amount the inner pleat leg 16a of one pleat overlaps the inner pleat leg 16a of an adjoining pleat.

Figure 5:
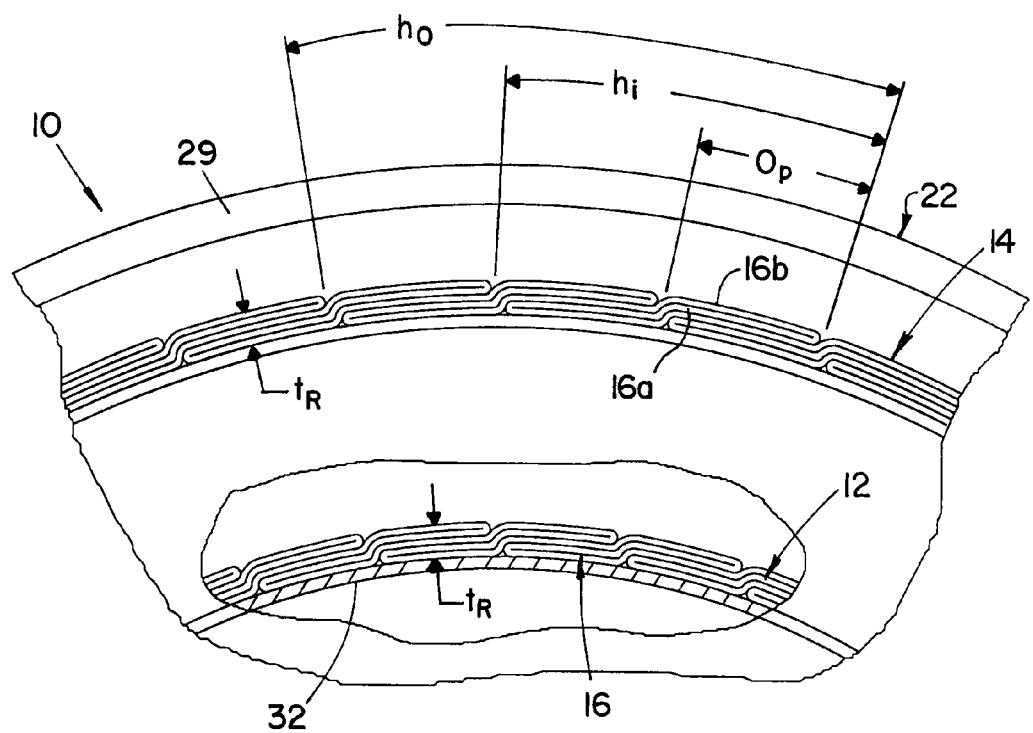
FIG. 5 is an enlarged localized end view of the filter assembly, with a portion of the end cap broken away to reveal the pleat configuration of the inner filter sleeve, and wherein adjoining circumferentially disposed arcuate pleats of the inner and outer filter sleeves partially overlap one another.

In one example shown in FIG. 5, the pleats 16 of both the inner and outer filter sleeves 12, 14 overlap one another over approximately 50% of the arc length of the pleats. Consequently, the inner and outer filter sleeves 12, 14 have a substantially continuous radial thickness $t_R$ equal to five (5) times the thickness of a pleat leg, about substantially the entire circumference of each filter sleeve. In this instance, the circumference "C" of each filter sleeve 12, 14 is defined by the following equation:

$$C=h_i \cdot N \cdot O_p$$

where N is the number of pleats forming the filter sleeve and $O_p$ is the percentage of overlap that exists between two adjacent pleats in the filter sleeve.

Thus, if the arc length or arcuate height $h_i$ of the radially inner leg 16a of each pleat 16 is about 1.0 inch and the arc length or arcuate height $h_o$ of the radially outer leg 16b of each pleat 16 is about 1.5 inches, one-third of the arcuate pleat height or 0.5 inches of the upstream and downstream surfaces of the outer pleat leg 16b of each pleat 16 will be exposed or otherwise out of contact with the surface of an adjacent pleat leg. Similarly, if the arc length or arcuate height $h_i$ of the radially inner leg 16a of each pleat 16 is about 0.75 inches and the arc length or arcuate pleat height $h_o$ of the radially outer leg 16b of each pleat 16 is about 1.125 inches, one-third of the arcuate pleat height or 0.375 inches of the upstream and downstream surfaces of the outer pleat leg 16b of each pleat 16 will be exposed or otherwise out of contact with the surface of an adjacent pleat leg.

In accordance with the subject disclosure, the total amount of overlap $O_T$ that exists between adjacent pleats 16 in a filter sleeve 12, 14 is defined by the following equation:

$$O_T=h_i \cdot O_p$$

Referring to FIG. 6, as mentioned above, inlet cap 22 is secured to the upper end of the inner and outer filter sleeves 12, 14. Specifically, the multi-layered composite structure of filter sleeves 12, 14 is ultrasonically welded, heat bonded or otherwise secured to the inlet cap 22 using any commonly known attachment method. The upper portion of the inner pleated filter sleeve 12 is directly secured to the outer peripheral surface of wall 42 of the inner body portion 22a of inlet cap 22. Similarly, the upper portion of the outer pleated filter sleeve 14 is directly secured to the outer peripheral wall 44 of the outer flange portion 22b of inlet cap 22.

Figure 7:
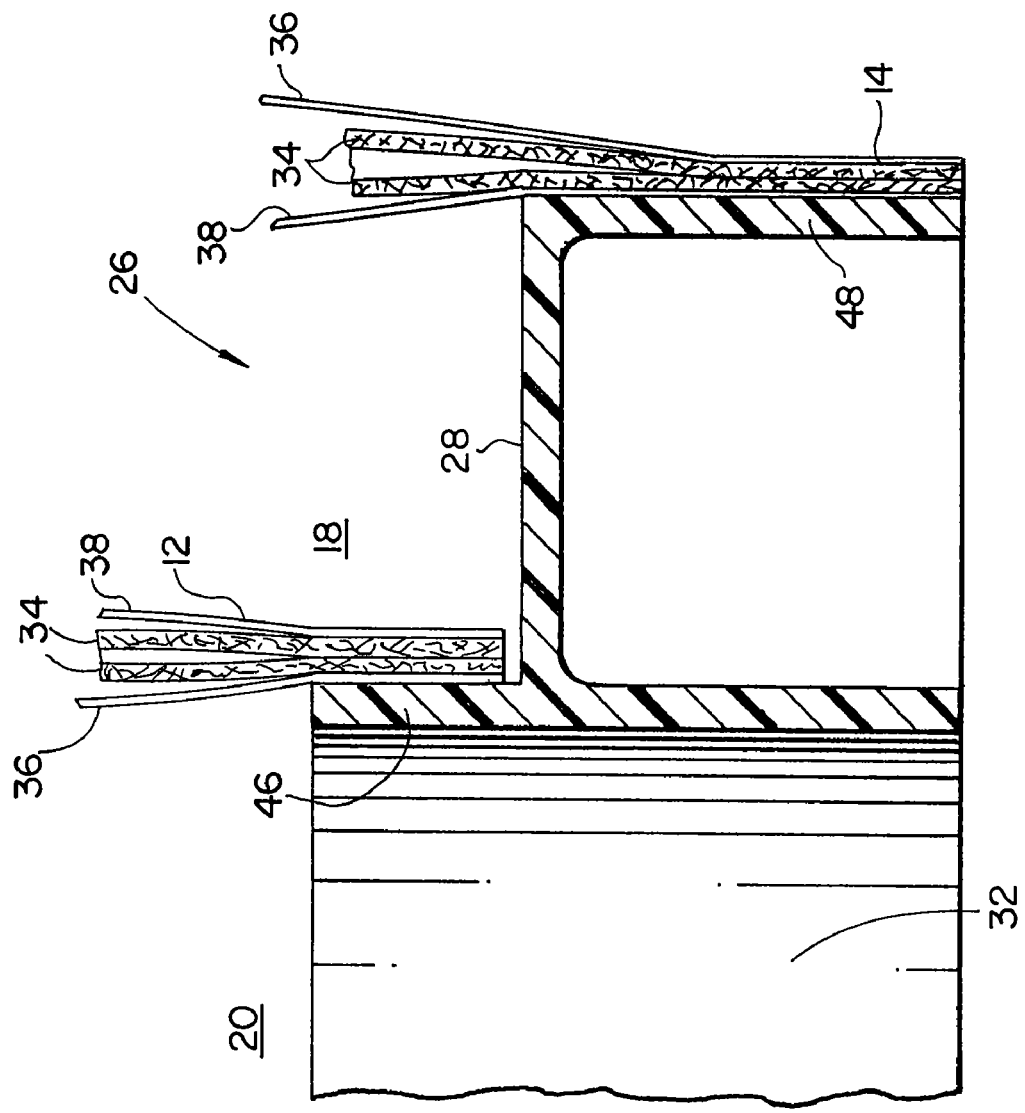
FIG. 7 is a cross-sectional view of a portion of the end cap shown in FIG. 3, taken along line 7-7, illustrating the manner in which the inner and outer sleeves of the filter element are secured to the end cap.

Referring to FIG. 7, as mentioned above, end cap 26 is secured to the lower end of the inner and outer filter sleeves 12, 14. Specifically, the multi-layered composite structure of filter sleeves 12, 14 is ultrasonically welded, heat bonded or otherwise secured to the end cap 26 using any commonly known attachment method. The lower portion of the inner pleated filter sleeve 12 is directly secured to the outer peripheral surface of an upstanding flange wall 46 of end cap 26. Similarly, the lower portion of the outer pleated filter sleeve 14 is directly secured to the outer peripheral surface of wall 48 of the end cap 26.

Those skilled in the art will readily appreciate that securing the filter sleeves 12, 14 to exterior or outer peripheral surfaces of the inlet cap 22 and end cap 26, as explained above, allows for more flexibility and lower costs during assembly. Those skilled in the art will also appreciate that by welding, bonding or otherwise sealing the media and support layers to each other at both ends of filter assembly 10, in the manner described above and illustrated in FIGS. 6 and 7, unfiltered fluid must flow through all of the media layers of the filter sleeves 12, 14. This eliminates any chance of bypass and premature plugging of the final filter layers, and allows the user to get the maximum life out of the filter assembly 10 of the subject disclosure. This is in contrast to typical pleated cartridge filters, which are assembled with ends caps that are typically potted or otherwise bonded to the opposed ends of the pleats, making bypass possible if the pleat ends are not completely encased.

Figure 8:
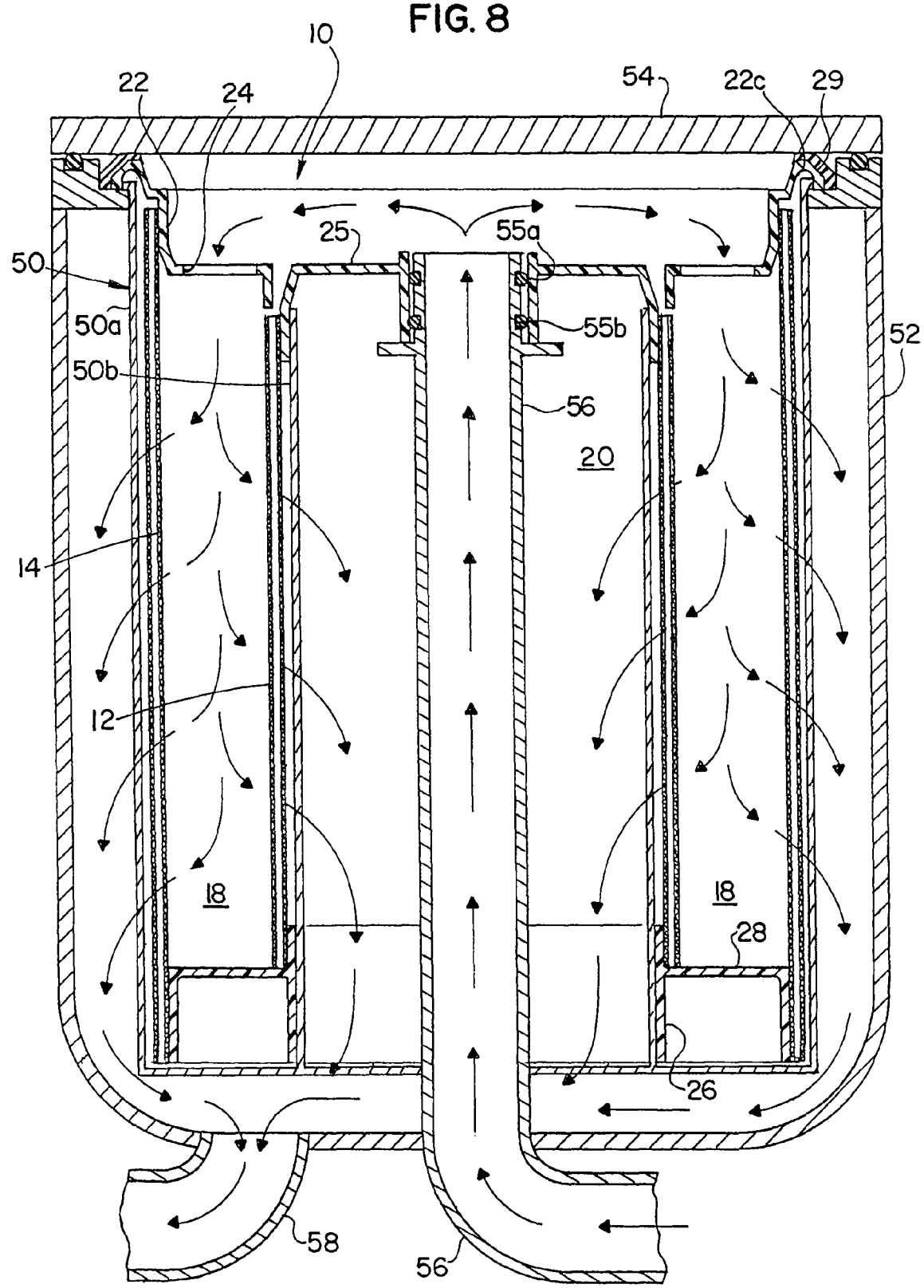
FIG. 8 is a cross-sectional view of the filter assembly of the subject disclosure disposed with a pressure vessel, wherein a series of arrows indicate the directional flow path of fluid through the filter assembly.

Referring now to FIG. 8, in use, the collapsible bag-type filter assembly 10 of the subject disclosure is disposed within a perforated basket or container 50, which is preferably metal. At such a time, the circumferential pleats 16 of the outer filter sleeve 14 are fully supported by the outer portion 50a of basket 50 and each other and therefore they will not shift during use. Additionally, the circumferential pleats 16 of the inner filter sleeve 12 are fully supported by the inner portion 50b of basket 50 and each other. Consequently, they will not shift during service. This allows for consistent pressure drops and longer filter life. The basket 50 is supported with a housing or pressure vessel 52, which has a removable top or cover 54. When the basket 50 is disposed within the housing 52, the over-molded elastomeric sealing surface 29 on the outer shoulder 22c of inlet cap 22 seals against the surface of housing cover 54. In addition, a pair of O-rings 55a, 55b, disposed about the upper end of the inlet conduit 56 of pressure vessel 52 sealingly engage the circumferential wall of the central access port 23 of inlet cap 22.

In operation, the inlet conduit 56 delivers unfiltered fluid into the trough formed by inlet cap 22, as indicated by the directional flow lines. The unfiltered fluid then flows through the plural inlet apertures 24 in inlet cap 22 and into the interior passage 18 formed between the inner and outer filter sleeves 12, 14 of filter assembly 10. Under pressure, the fluid is drawn through the pleated media layers of the inner and outer filter sleeves 12, 14 for filtration and conditioning. Thereafter, filtered fluid exits filter housing 52 through outlet conduit 58 at the bottom of the housing, as indicated by the directional flow lines.

Those skilled in the art will readily appreciate that the arrangement of the basket 50 and housing 52 illustrated in FIG. 8 is a non-limiting example of a system within which the filter assembly 10 may be employed. It is envisioned that the filter assembly 10 of the subject disclosure may be employed with other types of arrangements and systems without departing from the spirit or scope of the subject disclosure.

When the bag-type filter assembly 10 of the subject disclosure has exceeded its useful life, it may be easily removed from the housing 52. Upon removal, filter assembly 10 may be collapsed. This is accomplished by approximating the inlet cap 22 toward the end cap 26. The collapsed filter assembly may then be discarded. It should be appreciated by those skilled in the art that the size of the interior passage 18 of filter assembly 10 is relatively small as compared that of a standard bag-type filter which has only one filter media sleeve. Therefore, the hold-up volume associated with filter assembly 10 is substantially reduced as compared to a typical bag-type filter. The low hold-up volume promotes easy removal of the filter assembly 10 from the housing 52, and minimizes fluid loss, which can result in contamination of the area around the housing.

Figure 9:
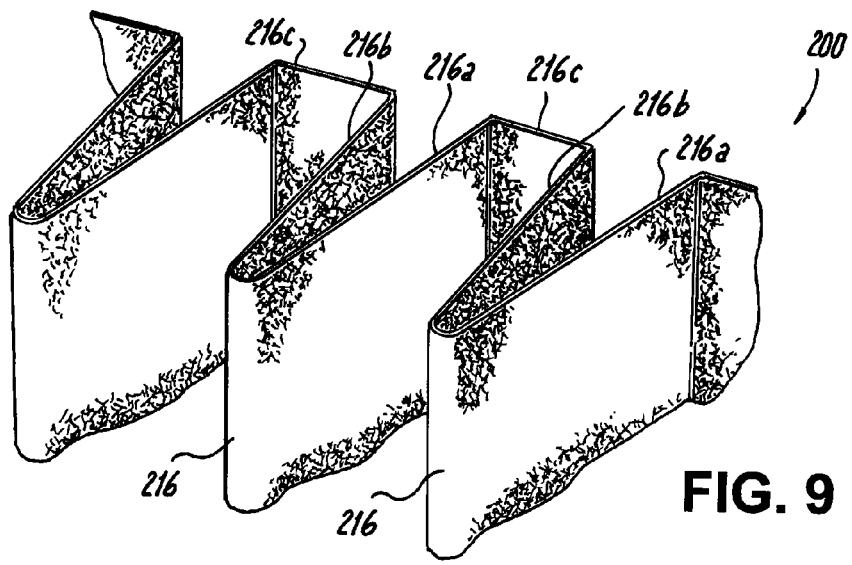
FIG. 9 is a perspective view of a pleat formation used to form the circumferential pleats of the subject disclosure, that includes upstanding pleats having first and second pleat legs of equal height, wherein the first pleat leg of one pleat is joined to the second pleat leg of a preceding pleat by a flat medial pleat section.
Figure 10:
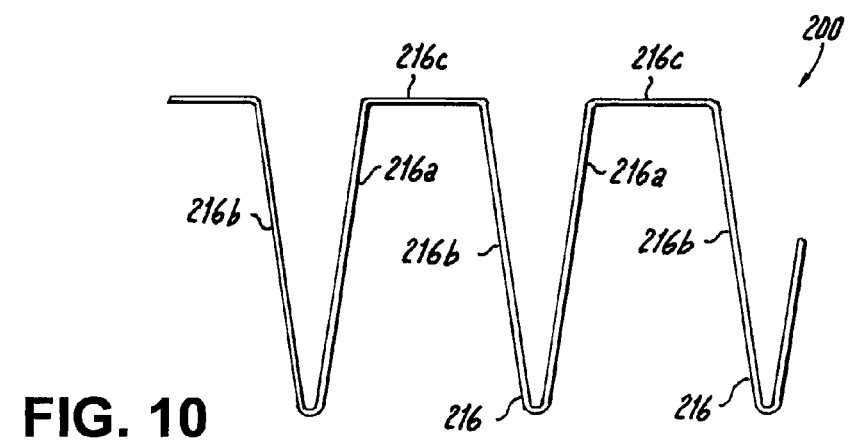
FIG. 10 is a top plan view of the pleat formation shown in FIG. 9.

Referring now to FIGS. 9 and 10, there is illustrated a pleat formation designated by reference numeral 200, which is used to form the circumferential pleats of the inner and outer filter sleeves of the filter assembly of the subject disclosure. Pleat formation 200 includes upstanding pleats 216, each having first and second pleat legs 216a and 216b of equal height. In pleat formation 200, the first pleat leg 216a of one pleat 216 is joined to the second pleat leg 216b of a preceding pleat 216 by a flat medial pleat section 216c.

Figure 11:
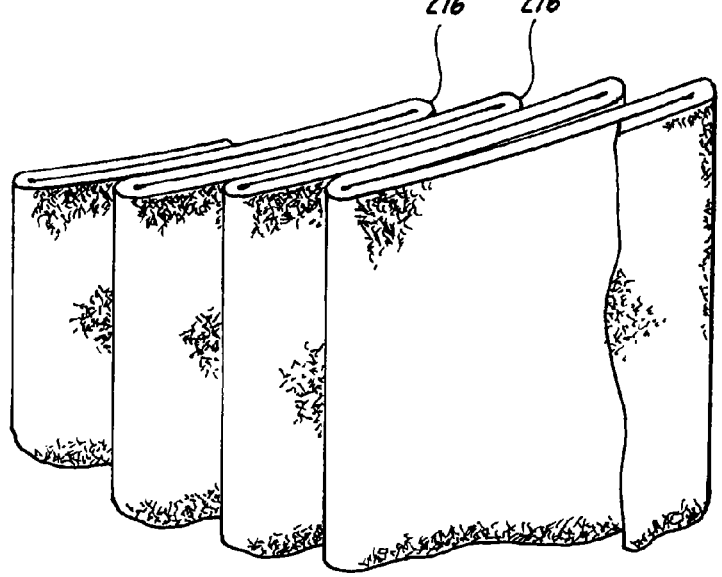
FIG. 11 is a perspective view of the circumferential pleats formed by moving the pleat formation of FIGS. 9 and 10 into an overlapped condition, wherein each medial pleat section becomes part of the second leg of a preceding pleat.

When the circumferential pleats of the subject disclosure are formed, the upstanding pleats 216 of pleat formation 200 are moved into an overlapped condition, which is shown in FIG. 11. In this overlapped condition, each medial pleat section 216c becomes part of the second leg 216b of a preceding pleat 216'. By way of example, if the height of each pleat leg 216a, 216b is 1.0 inch, and the length of the medial pleat section 216c is 0.050 inches, the resulting circumferential pleats 216' shown in FIG. 18 will each have a radially inner pleat leg with an arc length of 1.0 inch and a radially outer pleat leg with an arc length of 1.50 inches.

Figure 12:
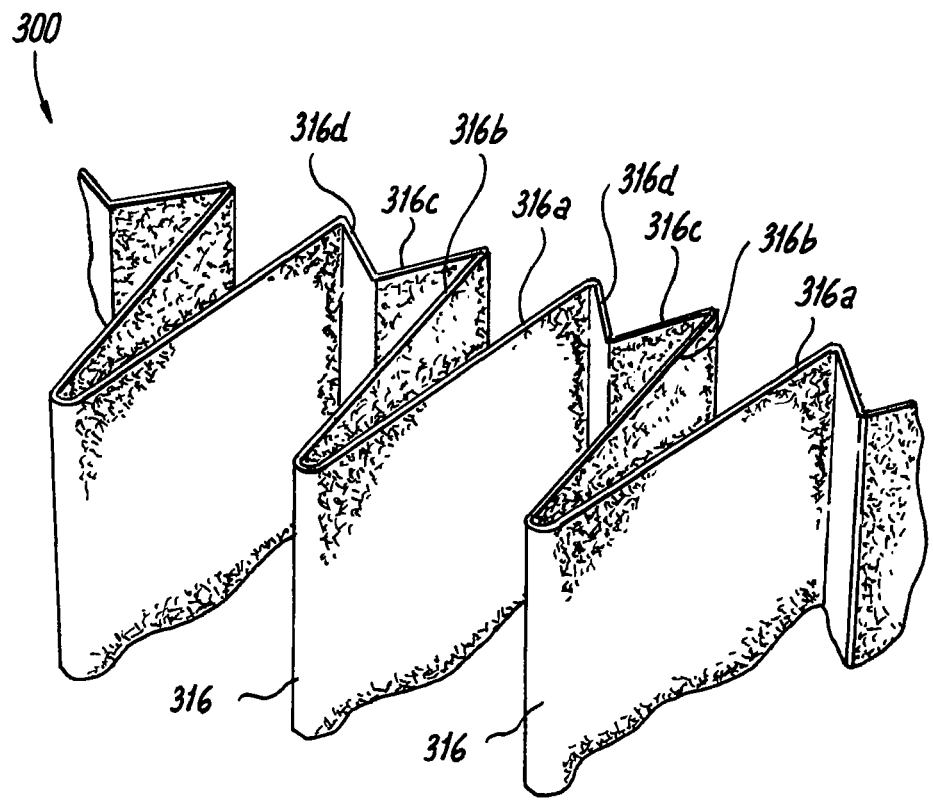
FIG. 12 is a perspective view of another pleat formation used to form the circumferential pleats of the subject disclosure, that includes upstanding pleats having first and second pleat legs of equal height, wherein the first pleat leg of one pleat is joined to the second pleat leg of a preceding pleat by a medial pleat section including two medial pleat segments of equal length.
Figure 13:
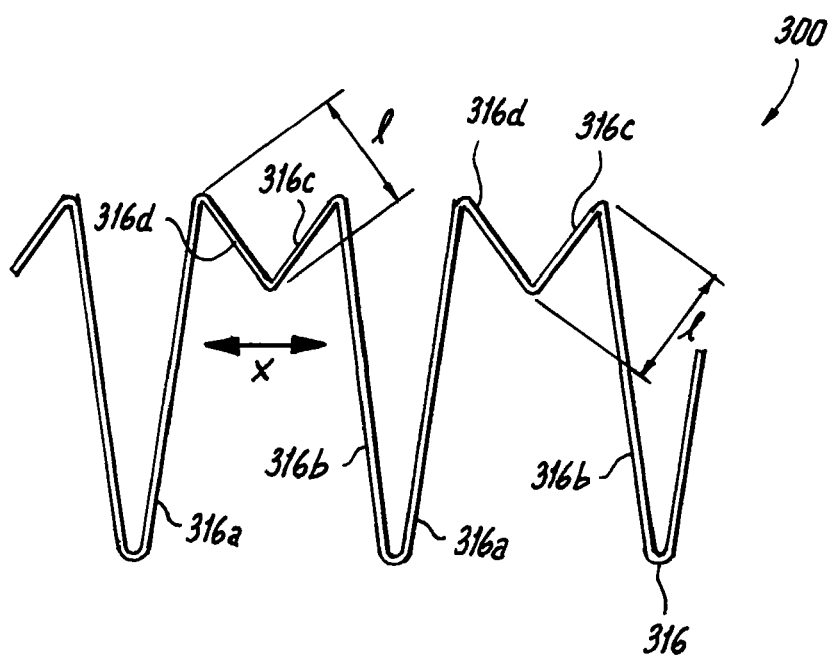
FIG. 13 is a top plan view of the pleat formation shown in FIG. 13.

Referring to FIGS. 12 and 13, there is illustrated another pleat formation designated by reference numeral 300, which is used to form the circumferential pleats of the inner and outer filter sleeves of the filter assembly of the subject disclosure. Pleat formation 300 includes upstanding pleats 316, each of which has first and second pleat legs 316a and 316b of equal height. In pleat formation 300, the first pleat leg 316a of one pleat 316 is joined to the second pleat leg 316b of a preceding pleat 316 by a medial pleat section that includes two medial pleat segments 316c and 316d of equal length "l". Thus, pleat formation 300 takes the form of a W-shape construction, consisting essentially of alternating tall and short pleats.

Figure 14:
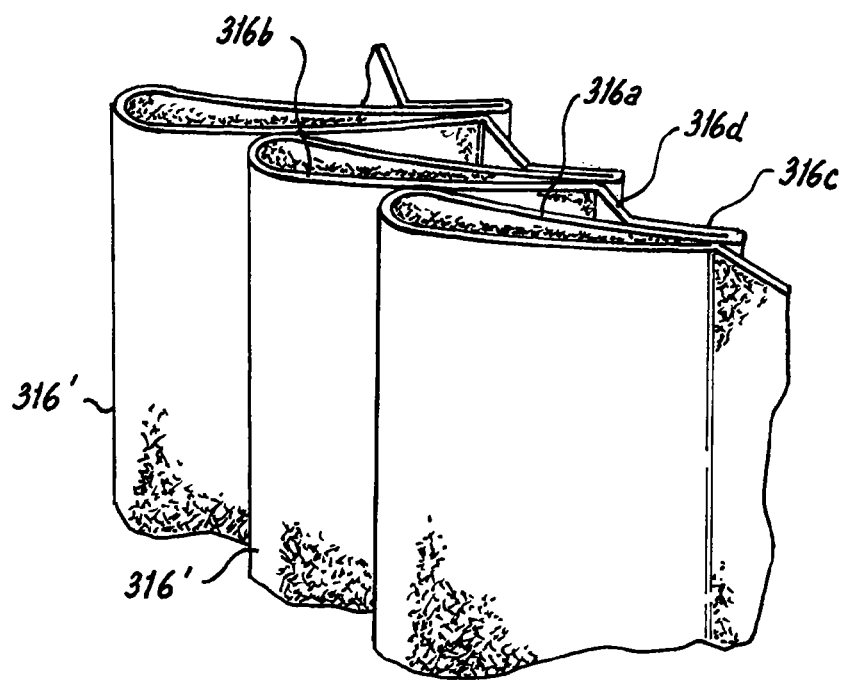
FIG. 14 is a perspective view of the circumferential pleats formed by moving the pleat formation of FIGS. 12 and 13 into an overlapped condition, wherein the two medial pleat segments of equal length are flattened to become part of the second leg of a preceding pleat.
Figure 15:
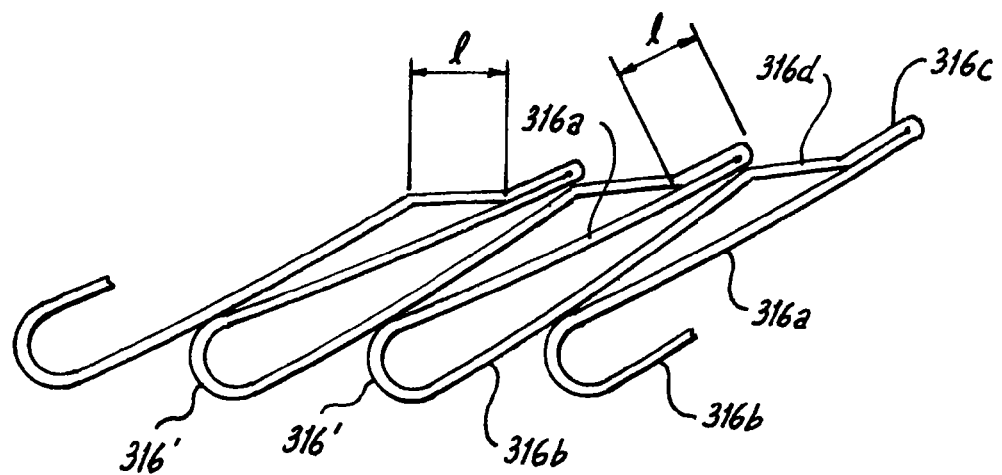
FIG. 15 is a top plan view of the circumferential pleats shown in FIG. 14.

When the circumferential pleats of the subject disclosure are formed, the two medial pleat segments 316c and 316d are splayed out, collapsed or otherwise flattened by moving in the direction indicated by arrow "x". The pleats 316 are then moved into an overlapped condition. In this condition, which is shown in FIGS. 14 and 15, the two medial pleat segments 316c and 316d become part of the second leg 316b of a preceding pleat 316. By way of example, if the height of each pleat leg 316a, 316b is 1.0 inch, and the length of each medial pleat segment 316c, 316d is 0.25 inches, the resulting circumferential pleats 316' will have a radially inner pleat leg with an arc length of 1.0 inch and a radially outer pleat leg with an arc length of 1.50 inches.

It is envisioned that the W-shaped configuration of pleat formation 300 can be employed to maintain adjacent pleat surfaces of the filter sleeves in spaced apart relationship, so that they do not contact one another over the majority of the axial length of the filter sleeves, and thus there is less restriction to flow through the sleeves. In this instance, surface-to-surface pleat contact would mainly occur at the opposed ends of the two filter sleeves, where the sleeves are sealed or otherwise affixed to the end caps. Alternatively, it is envisioned that the circumferential pleats formed by the W-shaped composite, could be secured in place using spot welds or a similar technique, so that the medial pleat are maintained in a flattened state.

Figure 16:
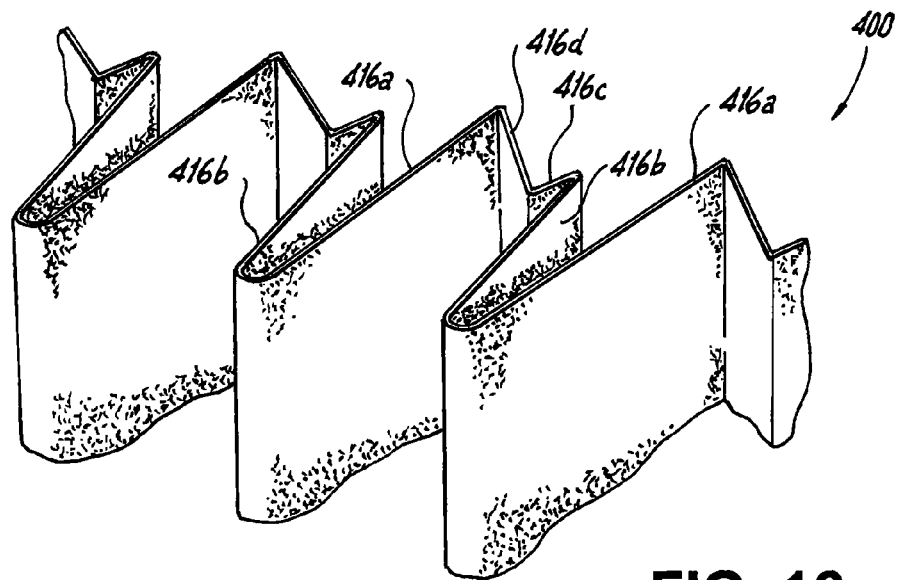
FIG. 16 is a perspective view of another pleat formation used to form the circumferential pleats of the subject disclosure, that includes upstanding pleats having first and second pleat legs of different height, wherein the first pleat leg of one pleat is joined to the second pleat leg of a preceding pleat by a medial pleat section including two medial pleat segments of different length.
Figure 17:
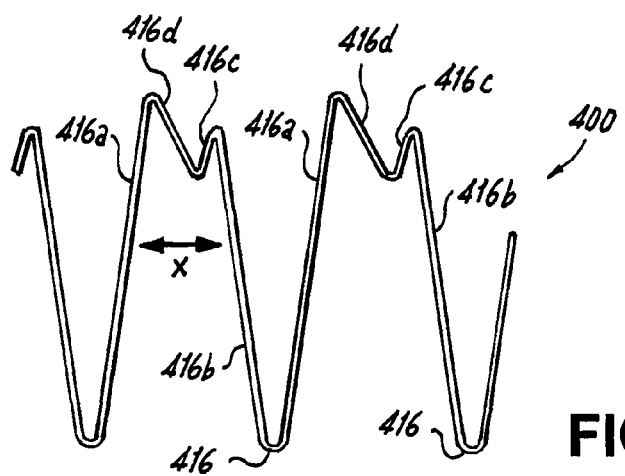
FIG. 17 is a top plan view of the pleat formation shown in FIG. 16.

Referring to FIGS. 16 and 17, there is illustrated another pleat formation designated by reference numeral 400, which is used to form the circumferential pleats of the inner and outer filter sleeves of the filter assembly of the subject disclosure. Pleat formation 400 includes upstanding pleats 416, each having first and second pleat legs 416a and 416b. In pleat formation 400, the first pleat leg 416a of each pleat 416 is longer than the second pleat leg 416b of each pleat 416. In addition, the first pleat leg 416a of one pleat 416 is joined to the second pleat leg 416b of a preceding pleat 416 by a medial pleat section that includes two medial pleat segments 416c and 416d of different length. Preferably, the length of the leading medial pleat segment 416c is less than the length of the trailing medial pleat segment 416d.

Figure 18:
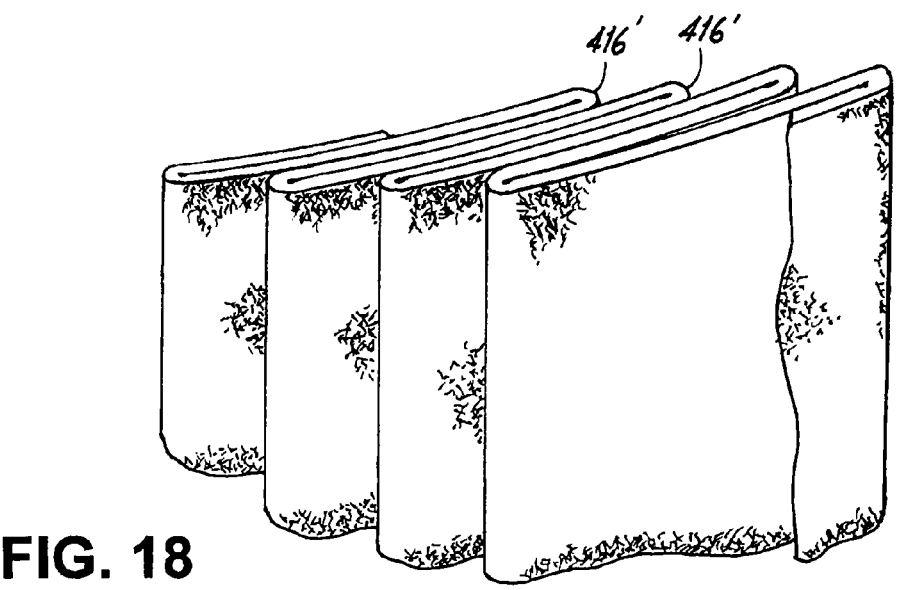
FIG. 18 is a perspective view of the circumferential pleats formed by moving the pleat formation of FIGS. 16 and 17 into an overlapped condition, wherein the two medial pleat segments of different length are flattened to become part of the second leg of a preceding pleat.

The medial pleats segments 416c, 416d are asymmetric and thus a preferential collapse zone is defined along the length of the longer trailing segment 416d. When the circumferential pleats 416' are formed, the two medial pleat segments 416c and 416d are collapsed or otherwise flattened out by moving in the direction indicated by arrow "x" to become part of the second leg 416b of a preceding pleat 416', as shown in FIG. 18.

Although the circumferentially pleated bag-type filter assembly of the subject disclosure has been described with respect to several presently preferred embodiments, those skilled in the art will readily appreciate that modifications or changes may be made thereto without departing from the spirit and scope of the present disclosure as defined by the appended claims.

What is claimed is:

1. A filter element comprising:
    an inlet cap having an outer peripheral surface;
    at least one filter sleeve comprising at least one filter media, an upper end, and a lower end, the at least one filter media further comprising a plurality of adjoining circumferentially disposed arcuate pleats, wherein each pleat has an inner pleat leg having an arc length $h_i$ and an outer pleat leg having an arc length $h_o$;
    an end cap having an outer peripheral surface;
    wherein the upper end of the at least one filter sleeve is secured to and is substantially parallel to the outer peripheral surface of the inlet cap, wherein the lower end of the at least one filter sleeve is secured to and is substantially parallel to the outer peripheral surface of the end cap, wherein a range from approximately ⅙ to less than ½ of the arc length $h_o$ of each outer pleat leg is in contact with the outer peripheral surfaces of the inlet cap and end cap.

2. The filter element of claim 1, wherein the at least one filter sleeve is secured to the outer peripheral surface of both the inlet cap and the end cap by at least one of ultrasonic welding and heat bonding.

3. The filter element of claim 1, wherein the inlet cap further comprises an elastomeric seal.

4. The filter element of claim 1, wherein the filter element is collapsible.

5. The filter element of claim 1, wherein the filter media is selected from the group consisting of melt-blown media, felt, wet-laid paper, glass fiber, microporous membranes, multi-layered composites, and combinations thereof.

6. The filter element of claim 1, wherein the at least one filter sleeve comprises an inner filter sleeve and an outer filter sleeve, wherein the inlet cap and the end cap are secured to both the inner filter sleeve and the outer filter sleeve, wherein a passage is defined between the inner filter sleeve and the outer filter sleeve, and wherein a central bore is defined inside the inner filter sleeve.

7. The filter element of claim 6, wherein the inlet cap further comprises at least one inlet port communicating with the passage, and wherein the end cap comprises an end surface closing the passage.

8. The filter element of claim 6, wherein at least one of the inlet cap and the end cap further comprises a central exit port communicating with the central bore.

9. The filter element of claim 6, wherein at least one of the inlet cap and the end cap is constructed of a first piece and a second piece, the first piece being secured to the inner filter sleeve and the second piece being secured to the outer filter sleeve.

10. A filter element comprising:
    an inlet cap having an outer peripheral surface;
    at least one filter sleeve comprising at least one filter media, an upper end, and a lower end, the at least one filter media having a thickness and further comprising a plurality of adjoining circumferentially disposed arcuate pleats, wherein each pleat comprises at least one crown and at least one root, and wherein each pleat has an inner pleat leg having an arc length $h_i$ and an outer pleat leg having an arc length $h_o$;
    an end cap having an outer peripheral surface;
    wherein the upper end of the at least one filter sleeve is secured to and is substantially parallel to the outer peripheral surface of the inlet cap, wherein the lower end of the at least one filter sleeve is secured to and is substantially parallel to the outer peripheral surface of the end cap;
    wherein, at the outer peripheral surface of both the inlet cap and the end cap, the at least one filter sleeve has a substantially continuous radial thickness about substantially the entire circumference of the filter sleeve, wherein the substantially continuous radial thickness is substantially equal to one of: five times the thickness of the filter media, seven times the thickness of the filter media, nine times the thickness of the filter media, or eleven times the thickness of the filter media.

11. The filter element of claim 10, wherein the at least one filter sleeve is secured to the outer peripheral surface of both the inlet cap and the end cap by at least one of ultrasonic welding and heat bonding.

12. The filter element of claim 10, wherein the circumferentially disposed arcuate pleats do not overlap one another, wherein the crown of each pleat resides near the root of the first adjoining pleat, and wherein the substantially continuous radial thickness is substantially equal to three times the thickness of the filter media.

13. The filter element of claim 10, wherein the inner pleat leg of each circumferentially disposed arcuate pleat overlaps the inner pleat leg of the adjacent circumferentially disposed pleat by up to 80% of the arc length $h_i$ of the inner pleat leg of the adjacent circumferentially disposed pleat.

14. The filter element of claim 10, wherein the inner pleat leg of each circumferentially disposed arcuate pleat overlaps the inner pleat leg of the adjacent circumferentially disposed pleat by approximately 50% of the arc length $h_i$ of the inner pleat leg of the adjacent circumferentially disposed pleat, wherein the crown of each pleat resides near the corresponding root of the adjacent pleat, and wherein the substantially continuous radial thickness is substantially equal to five times the thickness of the filter media.

15. The filter element of claim 10, wherein the at least one filter sleeve comprises an inner filter sleeve and an outer filter sleeve, wherein the inlet cap and the end cap are secured to both the inner filter sleeve and the outer filter sleeve, wherein a passage is defined between the inner filter sleeve and the outer filter sleeve, and wherein a central bore is defined inside the inner filter sleeve.

16. The filter element of claim 15, wherein the inlet cap further comprises at least one inlet port communicating with the passage, and wherein the end cap comprises an end surface closing the passage.

17. The filter element of claim 15, wherein at least one of the inlet cap and the end cap further comprises a central exit port communicating with the central bore.

18. The filter element of claim 15, wherein at least one of the inlet cap and the end cap is constructed of a first piece and a second piece, the first piece being secured to the inner filter sleeve and the second piece being secured to the outer filter sleeve.

19. A filter element comprising:
an inlet cap having an outer peripheral surface;
at least one filter sleeve having an inner circumference C and comprising at least one filter media, an upper end, and a lower end, the at least one filter media having a thickness and further comprising a plurality N of adjoining circumferentially disposed arcuate pleats, wherein each pleat comprises at least one crown and at least one root, and wherein each pleat has an inner pleat leg having an arc length $h_i$ and an outer pleat leg having an arc length $h_o$;
an end cap having an outer peripheral surface;
wherein the upper end of the at least one filter sleeve is secured to and is substantially parallel to the outer peripheral surface of the inlet cap, wherein the lower end of the at least one filter sleeve is secured to and is substantially parallel to the outer peripheral surface of the end cap;
wherein, at the outer peripheral surface of both the inlet cap and the end cap, the at least one filter sleeve has a substantially continuous radial thickness about substantially the entire circumference of the filter sleeve;
wherein the at least one filter sleeve is secured to the outer peripheral surface of both the inlet cap and the end cap by at least one of ultrasonic welding and heat bonding;
wherein the inner pleat leg of each circumferentially disposed arcuate pleat overlaps the inner pleat leg of the adjacent circumferentially disposed pleat by a percentage overlap $O_p$ of the arc length $h_i$ of the inner pleat leg of the adjacent circumferentially disposed pleat, wherein $O_p$ is up to 80%;
wherein C is defined by the following equation:

$$C = h_i \cdot N \cdot O_p.$$

20. The filter element of claim 19, wherein the at least one filter sleeve comprises an inner filter sleeve and an outer filter sleeve, wherein the inlet cap and the end cap are secured to both the inner filter sleeve and the outer filter sleeve, wherein a passage is defined between the inner filter sleeve and the outer filter sleeve, wherein a central bore is defined inside the inner filter sleeve, and wherein the inlet cap further comprises at least one inlet port communicating with the passage, and wherein the end cap comprises an end surface closing the passage.

21. The filter element of claim 20, wherein at least one of the inlet cap and the end cap further comprises a central exit port communicating with the central bore.

22. The filter element of claim 20, wherein at least one of the inlet cap and the end cap is constructed of a first piece and a second piece, the first piece being secured to the inner filter sleeve and the second piece being secured to the outer filter sleeve.

23. The filter element of claim 10, wherein the inner pleat leg of each circumferentially disposed arcuate pleat overlaps the inner pleat leg of the adjacent circumferentially disposed pleat by approximately 66% of the arc length $h_i$ of the inner pleat leg of the adjacent circumferentially disposed pleat, wherein the crown of each pleat resides near the corresponding root of the adjacent pleat, and wherein the substantially continuous radial thickness is substantially equal to seven times the thickness of the filter media.

24. The filter element of claim 10, wherein the inner pleat leg of each circumferentially disposed arcuate pleat overlaps the inner pleat leg of the adjacent circumferentially disposed pleat by approximately 75% of the arc length $h_i$ of the inner pleat leg of the adjacent circumferentially disposed pleat, wherein the crown of each pleat resides near the corresponding root of the adjacent pleat, and wherein the substantially continuous radial thickness is substantially equal to nine times the thickness of the filter media.

25. The filter element of claim 10, wherein the inner pleat leg of each circumferentially disposed arcuate pleat overlaps the inner pleat leg of the adjacent circumferentially disposed pleat by approximately 80% of the arc length $h_i$ of the inner pleat leg of the adjacent circumferentially disposed pleat, wherein the crown of each pleat resides near the corresponding root of the adjacent pleat, and wherein the substantially continuous radial thickness is substantially equal to eleven times the thickness of the filter media.

26. The filter element of claim 1 wherein the ratio $h_i/h_o$ is greater than ½ and less than or equal to about ⅚.

27. The filter element of claim 26, wherein the ratio $h_i/h_o$ is greater than ½ and less than or equal to about ⅘.

28. The filter element of claim 27, wherein a range from approximately ⅕ to less than ½ of the arc length $h_o$ of each outer pleat leg is in contact with the outer peripheral surfaces of the inlet cap and end cap.

29. The filter element of claim 26, wherein the ratio $h_i/h_o$ is greater than ½ and less than or equal to about ¾.

30. The filter element of claim 29, wherein a range from approximately ¼ to less than ½ of the arc length $h_o$ of each outer pleat leg is in contact with the outer peripheral surfaces of the inlet cap and end cap.

31. The filter element of claim 26, wherein the ratio $h_i/h_o$ is greater than ½ and less than or equal to about ⅔.

32. The filter element of claim 31, wherein a range from approximately ⅓ to less than ½ of the arc length $h_o$ of each outer pleat leg is in contact with the outer peripheral surfaces of the inlet cap and end cap.

33. A filter element comprising:
a filter sleeve comprising at least one filter media comprising a plurality N of adjoining circumferentially disposed arcuate pleats, wherein each pleat has an inner pleat leg having an arc length $h_i$ and an outer pleat leg having an arc length $h_o$, the filter sleeve having an inner circumference C formed by adjacent portions of the outer pleat legs of adjacent circumferentially disposed arcuate pleats;
wherein the inner pleat leg of each circumferentially disposed arcuate pleat overlaps the inner pleat leg of the adjacent circumferentially disposed pleat by a percentage overlap $O_p$ of the arc length $h_i$ of the inner pleat leg of the adjacent circumferentially disposed pleat, wherein $O_p$ is up to 80%;
wherein C is defined by the following equation:

$$C = h_i \cdot N \cdot O_p.$$

34. The filter element of claim 33 wherein the filter sleeve comprises an upper end, the filter element further comprising:
an inlet cap secured to the upper end of the filter sleeve, the inlet cap having an outer peripheral surface; and
wherein a range from approximately ⅙ to less than ½ of the arc length $h_o$ of each outer pleat leg is in contact with the outer peripheral surface of the inlet cap.

* * * * *

UNITED STATES PATENT AND TRADEMARK OFFICE
CERTIFICATE OF CORRECTION

| | | |
|---|---|---|
| PATENT NO. | : 7,922,006 B2 | Page 1 of 1 |
| APPLICATION NO. | : 11/770834 | |
| DATED | : April 12, 2011 | |
| INVENTOR(S) | : Brian L Fall | |

It is certified that error appears in the above-identified patent and that said Letters Patent is hereby corrected as shown below:

Title Page Item (75) Inventors, left column, residence of the third inventor, delete "Pantsville, CT (US);" and insert --Plantsville, CT (US);--.

Signed and Sealed this
Twenty-first Day of June, 2011

David J. Kappos
*Director of the United States Patent and Trademark Office*